United States Patent [19]

Dewprashad et al.

[11] Patent Number: 5,368,102
[45] Date of Patent: Nov. 29, 1994

[54] CONSOLIDATABLE PARTICULATE MATERIAL AND WELL TREATMENT METHOD

[75] Inventors: Brahmadeo Dewprashad; Jimmie D. Weaver, both of Duncan, Okla.

[73] Assignee: Halliburton Company, Duncan, Okla.

[21] Appl. No.: 118,702

[22] Filed: Sep. 9, 1993

[51] Int. Cl.⁵ ............... E21B 43/04; E21B 43/267; C08L 63/00
[52] U.S. Cl. ............... 166/276; 166/280; 166/295; 252/8.551; 427/221; 523/131
[58] Field of Search ............... 166/276, 280, 295, 308; 252/8.551; 427/221; 523/130, 131

[56] References Cited

U.S. PATENT DOCUMENTS

| | | | |
|---|---|---|---|
| 2,986,538 | 5/1961 | Nesbitt et al. | 427/221 X |
| 3,335,796 | 8/1967 | Parker, Jr. . | |
| 3,857,444 | 12/1974 | Copeland | 166/276 |
| 3,929,191 | 12/1975 | Graham et al. | 166/280 |
| 4,042,031 | 8/1977 | Knapp | 166/276 |
| 4,042,032 | 8/1977 | Anderson et al. | 166/276 |
| 4,199,484 | 4/1980 | Murphey | 252/8.551 X |
| 4,428,426 | 1/1984 | Davies et al. | 166/276 |
| 4,428,427 | 1/1984 | Friedman | 166/278 |
| 4,581,253 | 4/1986 | Evans et al. | 166/280 |
| 4,785,884 | 11/1988 | Armbruster | 166/280 |
| 4,829,100 | 5/1989 | Murphey | 166/295 X |
| 4,923,714 | 5/1990 | Gibb et al. | 166/280 |
| 5,095,987 | 3/1992 | Weaver et al. | 166/276 |
| 5,128,390 | 7/1992 | Murphey et al. | 523/130 |

*Primary Examiner*—George A. Suchfield
*Attorney, Agent, or Firm*—Robert A. Kent; Dennis D. Brown

[57] ABSTRACT

A well treating composition comprising: a gelled carrier; a particulate material; an epoxy resin system including at least one epoxy resin; and a finely-divided hardening agent which, when dissolved, is operable for hardening the epoxy resin. The finely-divided hardening agent is dispersed in the epoxy resin system. A method of treating a subterranean zone located in a well comprising the steps of: (a) preparing the above-described treating composition; (b) injecting the treating composition into the well such that the treating composition is placed in the subterranean zone; and (c) maintaining the finely-divided hardening agent under conditions such that, prior to injecting the treating composition into the well, the finely-divided hardening agent does not substantially dissolve.

10 Claims, No Drawings

CONSOLIDATABLE PARTICULATE MATERIAL AND WELL TREATMENT METHOD

FIELD OF THE INVENTION

The present invention relates to consolidatable epoxy resin-coated particulate materials. The present invention also relates to methods for treating subterranean formations using consolidatable epoxy resin-coated particulate materials.

BACKGROUND OF THE INVENTION

Consolidatable epoxy resin-coated particulate materials have been used heretofore in various well treatment operations. Consolidatable epoxy resin-coated sands have been used, for example, for gravel packing, for the development of controlled permeability synthetic formations within subterranean zones, and as proppant materials in formation fracturing operations. Due to their desirable permeability and compressive strength characteristics, consolidatable epoxy resin-coated particulate materials are especially well-suited for treating semiconsolidated and unconsolidated formations which contain loose or unstable sands.

As used herein, the term "consolidatable epoxy resin-coated particulate material" refers to a particulate material which is coated with an uncured or only partially cured epoxy resin composition. Typically, the consolidatable epoxy resin-coated particulate material will be injected into a subterranean zone using procedures whereby the epoxy resin does not substantially harden until after the particulate material has been delivered to a desired location within the formation. The consolidatable epoxy resin-coated particulate material will typically harden within the formation to form a hard, consolidated, permeable mass.

Well treatment methods utilizing consolidatable epoxy resin-coated particulate materials are disclosed, for example, in U.S. Pat. No. 5,128,390. The entire disclosure of U.S. Pat. No. 5,128,390 is incorporated herein by reference.

U.S. Pat. No. 5,128,390 discloses a method for continuously forming and transporting consolidatable resin-coated particulate materials. In the method of U.S. Pat. No. 5,128,390, a stream of gelled aqueous carrier liquid is continuously mixed with a particulate material (e.g., sand), a hardenable epoxy resin composition, and a surface active agent. The resulting continuous composition is delivered to and/or injected into a desired subterranean zone. As the continuous mixture flows down the well tubing toward the subterranean zone, the composition ingredients are thoroughly mixed such that the gel-suspended particulate material is coated with the hardenable epoxy resin composition. After being placed in the subterranean zone, the epoxy resin composition is allowed to harden whereby the resin-coated particulate material forms a hard, permeable, consolidated mass.

The hardenable epoxy resin composition used in the method of U.S. Pat. No. 5,128,390 is generally composed of: a polyepoxide resin carried in a solvent system; a hardening agent; a coupling agent; and a hardening rate controller. The hardening agent used in the method of U.S. Pat. No. 5,128,390 is either (a) an amine, a polyamine, an amide, and/or a polyamide dissolved in a suitable solvent or (b) a liquid eutectic mixture of amines diluted with methyl alcohol.

Unfortunately, well treatment methods of the type disclosed in U.S. Pat. No. 5,128,390 are not well-suited for use in high temperature subterranean formations. Consolidated epoxy/hardener compositions of the type used in the methods of U.S. Pat. No. 5,128,390 typically cannot withstand temperatures substantially exceeding about 200° F. However, such temperature conditions are commonly encountered in subterranean formations.

Thus, a need presently exists for a consolidatable resin-coated particulate material and method which can be used for treating high temperature subterranean zones and formations (i.e., zones and formations having temperatures exceeding about 200° F.).

Diaminodiphenylsulfone (DDS) has been used heretofore as a hardener in certain epoxy resin compositions. DDS generally provides high temperature resistance and high chemical resistance properties. At ambient conditions, DDS is typically a solid material which will not substantially dissolve in most of the solvents and/or diluents used in epoxy resin systems. Thus, when blending DDS with an epoxy resin, the blend components must typically be heated sufficiently to enable the DDS to be dissolved in the epoxy resin system.

In view of the difficulties encountered when blending DDS with epoxy resins, the use of DDS as an epoxy resin hardener in well treatment operations has not heretofore been a viable alternative. The heating and blending operations required for dissolving DDS in epoxy resin systems typically cannot be economically and conveniently conducted at the well site. Additionally, it is generally not possible to perform the blending operation off-site and then deliver the DDS/epoxy resin blend to the well site since: (a) the resulting DDS/epoxy resin composition will typically have a very short pot life; (b) the DDS/epoxy resin composition will, in many cases, harden before it can be delivered to the well site and used; and (c) even if the blend does not harden before use, any excess material produced and delivered to the well site is simply wasted.

SUMMARY OF THE INVENTION

The present invention provides a consolidatable epoxy resin-coated particulate material composition which is well-suited for use in high temperature subterranean zones. The present invention also resolves the various problems encountered heretofore in the use of diaminodiphenylsulfone (DDS) and other such high temperature hardening agents.

In one aspect, the present invention provides a composition for treating subterranean zones. The composition comprises: a gelled carrier; a particulate material; an epoxy resin system including at least one epoxy resin; and a finely-divided hardening agent. The finely-divided hardening agent is a material which, when dissolved, is operable for hardening the epoxy resin. At least a portion of the finely-divided hardening agent is dispersed in the epoxy resin system. The finely-divided hardening agent preferred for use in the inventive composition is 4,4'-diaminodiphenylsulfone.

In another aspect, the present invention provides a method of treating a subterranean zone located in a well. The inventive method utilizes a treating composition comprising: a gelled carrier; a particulate material; an epoxy resin system including at least one epoxy resin; and a finely-divided hardening agent which, when dissolved, is operable for hardening the epoxy resin, at least a portion of the finely-divided hardening agent being dispersed in the epoxy resin system. The inventive method comprises the steps of: (a) preparing the treating composition; (b) injecting the treating composition into the well such that the treating composition is placed in the subterranean zone; and (c) maintaining the finely-divided hardening agent under conditions such that, prior to injecting the treating composition into the well in accordance with step (b), the finely-divided hardening agent does not substantially dissolve. The finely-divided hardening agent used in the inventive method is preferably 4,4'-diaminodiphenylsulfone.

In yet another aspect, the present invention provides a method comprising the steps of: (a) mixing finely-divided 4,4'-diaminodiphenylsulfone with an epoxy resin system including at least one epoxy resin, said finely-divided diaminodiphenylsulfone being mixed with the epoxy resin system in an effective amount for hardening the epoxy resin and (b) maintaining the mixture formed in step (a) under conditions such that, for a period of at least about one day, the finely-divided 4,4'-diaminodiphenylsulfone does not substantially dissolve in the epoxy resin system.

The present invention resolves the various problems encountered heretofore in the use of DDS and similar high temperature hardening agents. The components of the inventive well treating composition can be conveniently and economically blended at the well site using standard mixing techniques and devices. Since the finely-divided hardening agent used in the inventive composition does not substantially dissolve until after the composition is pumped into the well, there is very little chance that the epoxy resin component of the composition will significantly harden before the composition is properly placed downhole. Once in place, the inventive composition consolidates to form a hard permeable mass having a significantly higher compressive strength and a substantially higher fracture conductivity than does uncoated sand. Thus, the inventive composition and method are well-suited for use in gravel packing operations, fracturing procedures, and other such well treating techniques.

If desired, the epoxy resin and finely-divided hardening agent components of the inventive composition can be premixed to provide a one package epoxy system having a desirably long pot life. The inventive one package epoxy system will not substantially harden until the temperature of the system is raised sufficiently to cause a significant amount of the finely-divided hardening agent to dissolve. When, for example, the finely-divided hardening agent used in the inventive one package system is 4,4'-diaminodiphenylsulfone, the one package system can typically be stored for more than 25 days at temperatures not substantially exceeding 75° F.

Further objects, features, and advantages of the present invention will be readily apparent to those skilled in the art upon reading the following description of the preferred embodiments.

DESCRIPTION OF THE PREFERRED EMBODIMENTS

As indicated above, the inventive well treating composition comprises: an epoxy resin system; one or more finely-divided hardening agents which, when dissolved, is (are) operable for hardening the epoxy resin system; a gelled carrier; and a particulate material. The inventive well treating composition can optionally include one or more members selected from the group consisting of: a solvent or solvent system for the epoxy resin system; a diluent or diluent system for the hardening agent; one or more coupling agents; one or more compounds which are operable for crosslinking the epoxy resin system; various surfactants; hardening rate controllers; methanol; and one or more aliphatic alcohols.

The epoxy resin system used in the inventive well treating composition is composed of one or more epoxy resins which (a) will coat the particulate material when the particulate material is suspended in the gelled carrier and (b) will harden when placed downhole such that the epoxy resin-coated particulate material is thereby consolidated to form a hard permeable mass. Examples of epoxy resins preferred for use in the present invention include: the diglycidyl ethers of bisphenol-A; the diglycidyl ethers of bisphenol-F; the glycidyl ethers of aminophenols; the glycidyl ethers of methylenedianiline; and epoxy novolac resins. The epoxy resins used in the inventive well treating composition will preferably have epoxide equivalent weights (EEW) in the range of from about 90 to about 300. The EEW of an epoxy resin is determined by dividing the molecular weight of the epoxy resin by the number of epoxide groups contained in each molecule of the epoxy resin.

The epoxy resin system used in the inventive well treating composition can also include a solvent or solvent system. When used, the solvent or solvent system will preferably be included in the epoxy resin system in an amount sufficient to ensure that the viscosity of the epoxy resin system does not substantially exceed about 5000 centipoise at 75° C. Examples of solvents suitable for use in the epoxy resin system include polar organic diluents which are reactive with epoxide and polyepoxide resins; polar organic diluents which are substantially nonreactive with epoxy resins; and mixtures thereof. Examples of suitable reactive polar organic diluents include: butylglycidylether; cresolglycidylether; alkylglycidylether; phenylglycidylether; and generally any other glycidyl ether which is miscible with the epoxy resin(s) used. Examples of substantially nonreactive polar organic diluents suitable for use in the epoxy resin system are disclosed in U.S. Pat. No. 5,128,390. Preferred nonreactive polar organic diluents include: ethylacetate; butyl lactate; ethyl lactate; amyl acetate; ethylene glycol diacetate; and propylene glycol diacetate.

When possible, any solvent used in the inventive well treating composition will preferably be a material in which the finely-divided hardening agent will not substantially dissolve at ambient conditions.

The epoxy resin system is present in the inventive well treating composition in an effective amount for consolidating the particulate material to form a hard permeable mass. Typically, the amount of epoxy resin system used in the inventive composition will be an amount providing in the range of from about 1 to about 20 pounds of epoxy resin per 100 pounds of particulate material. When, for example, the epoxy resin system consists essentially of a mixture of N,N,N',N'-tetraglycidyl-4,4'-methylenebisbenzamine and 1,4-butanediol diglycidyl ether, the amount of epoxy resin system used in the inventive composition will preferably be an amount providing in the range of from about 2 to about 5 pounds of epoxy resin per 100 pounds of particulate material.

The hardening agent used in the inventive well treating composition can generally be any hardening agent which: (a) can be provided in finely-divided form; (b) can be readily dispersed in the epoxy resin system; (c) can be maintained under conditions such that it will not substantially dissolve prior to being injected into a well; and (d) will operate, when dissolved, to harden the epoxy resin system. The hardening agent is preferably a material which will provide a hardened epoxy resin composition which (a) exhibits substantially higher compressive strength and fracture conductivity properties than does uncoated sand and (b) substantially retains these properties at temperatures of at least about 325° F. Most preferably, the hardening agent is an agent which will yield a hardened epoxy resin composition which is well-suited for use at temperatures in the range of from about 200° F. to about 350° F.

Examples of finely-divided hardening agents preferred for use in the present invention include: 4,4'-diaminodiphenylsulfone, 3,3'-diaminodiphenylsulfone, meta-phenylenediamine, 4,4'-[1,4-phenylene(1-methylethylidene)]bis(benzenamine), and 4,4'-[1,4-phenylene(1-methylethylidene)]bis(2,6-dimethylbenzenamine). Due to their relative low solubilities in most epoxy resin systems, aromatic diamines are particularly well-suited for use in the present invention.

The hardening agent most preferred for use in the inventive well treating composition is 4,4'-diaminodiphenylsulfone (4,4'-DDS). The solubility of 4,4'-DDS in most epoxy resin systems is typically very low. Additionally, hardened epoxy resin compositions provided through the use of 4,4'-DDS are highly temperature-resistant and chemical-resistant. Further, hardened epoxy resin compositions formed through the use of 4,4'-DDS are particularly well-suited for temperatures in the range of from about 200° to about 350° F. Moreover, in comparison to other hardening agents used in the art, 4,4'-DDS presents an extremely low health risk.

The amount of finely-divided hardening agent used in the inventive well treating composition is an amount which, when dissolved, is effective for hardening the epoxy resin system. If the hardening agent used in the inventive composition is finely-divided 4,4'-DDS, said 4,4'-DDS is preferably included in the inventive composition in an amount in the range of from about 25 g to about 45 g per 100 g of epoxy resin.

The individual particles of the finely-divided hardening agent will preferably have sizes in the range of from about 1 to about 100 microns. Such particulate materials can be prepared, for example, by grinding the hardening agent in a mill.

In order to facilitate component blending, the finely-divided hardening agent can be added to the well treating composition in a slurry form. Examples of diluent liquids preferred for use in forming the hardening agent slurry include methanol, ethanol, isopropyl alcohol, ethyl acetate, butyl lactate, toluene, xylene, isoamyl alcohol, isohexyl alcohol, and mixtures thereof. When possible, the diluent will preferably be a liquid material in which the finely-divided hardening agent will not substantially dissolve at ambient conditions.

Although the gelled carrier liquid used in the inventive well treating composition can generally be any gelled carrier commonly used in the art, the gelled carrier liquid is preferably a gelled aqueous composition. The gelled aqueous composition can generally be formed using fresh water, brine, seawater or the like.

Generally any gelling agent commonly used in well treating operations to form gelled aqueous carrier liquids can be used in the present invention. The gelling agents preferred for use in the present invention are polysaccharides having molecular weights in the range of from about 100,000 to about 4,000,000. Polysaccharides having molecular weights in the range of from about 600,000 to about 2,400,000 are particularly well-suited for use in the present invention. The polysaccharide gelling agent will preferably include hydroxyethyl or other substituents which provide water hydration and other characteristics conducive to the formation of a clear aqueous gel having a viscosity of at least about 30 centipoise on a Fann V.G. meter at 300 rpm. Examples of polysaccharide polymers preferred for use in the inventive well treating composition include: substituted carboxy and hydroxy alkyl cellulose (e.g., hydroxyethyl cellulose and carboxymethyl hydroxyethyl cellulose); guar gum; and guar gum derivatives (e.g., hydroxy propyl guar). The gelling agent used in the inventive composition is most preferably either hydroxypropyl guar or carboxyethyl hydroxypropyl guar and most preferably has a propylene oxide substitution of from about 0.1 to about 0.7 moles of propylene oxide per mole of mannose and galactose contained in the guar.

The amount of polysaccharide gelling agent used in forming the gelled aqueous carrier liquid will preferably be an amount in the range of from about 20 to about 120 pounds of gelling agent per 1000 gallons of water. The gelled aqueous carrier liquid will preferably have a viscosity in the range of from about 10 centipoise to about 400 centipoise. Most preferably, the gelled aqueous carrier liquid is comprised of from about 30 to about 50 pounds of hydroxypropyl guar gelling agent per 1000 gallons of water and has a viscosity in the range of from 15 to about 100 centipoise.

The gelled aqueous carrier liquid can also include one or more gel crosslinking agents. Examples of gel crosslinking agents preferred for use in the present invention include: titanium lactate; titanium triethanolamine; aluminum acetate; magnesium oxide; and zirconium salts.

The inventive well treating composition preferably also includes one or more gel breakers. The gel breakers preferred for use in the inventive composition are materials which are operable for breaking the aqueous carrier gel, and thereby reducing the viscosity of the aqueous carrier liquid, at a time substantially corresponding to the placement of the inventive composition in a desired subterranean zone. When the carrier liquid gel is broken, the carrier liquid readily separates from the remainder (i.e., the epoxy resin-coated particulate portion) of the well treating composition. As a result, the epoxy resin-coated particulate material is allowed to consolidate and thereby form a hard permeable mass in the subterranean zone.

When the gelling agent used in the inventive composition is a substituted cellulose-type gelling agent, the gel breaker used will preferably be an enzyme-type gel breaker (e.g., cellulase) or an oxidant such as sodium persulfate. When the gelling agent used in the inventive composition is a substituted guar gelling agent, the gel breaker will preferably be a hemicellulase or an oxidant such as sodium persulfate.

The particulate material used in the inventive composition can generally be any proppant or other water-insoluble particulate material of the type used in fracturing, gravel packing, and similar well treating operations. Examples include: sand; glass beads; nut shells; metallic pellets; gravel; synthetic resin pellets; gilsonite; coke; sintered alumina; mullite; and combinations thereof. The particulate material used in the present invention is most preferably sand. The particulate material will preferably have a particle size distribution in the range of from about 10 to about 70 mesh, U.S. sieve series.

The amount of particulate material used in the inventive composition is preferably an amount in the range of from about 2 to about 20 pounds of particulate material per gallon of the gelled aqueous carrier liquid. Most preferably, the amount of particulate material used in the inventive composition is an amount in the range of from about 3 to about 15 pounds of particulate material per gallon of gelled carrier liquid.

One or more coupling agents can optionally be used in the inventive composition to facilitate the coupling of the epoxy resin(s) with the particulate component of the inventive composition. Coupling agents preferred for use in the inventive composition are functional silanes. The coupling agent used in the inventive composition is preferably a N-beta-(aminoethyl)-gamma-aminopropyl-trimethoxysilane. The amount of coupling agent used in the inventive composition will preferably be in an amount in the range of from about 0 to about 2 parts by weight per 100 parts by weight of epoxy resin used in the inventive composition.

As will be understood by those skilled in the art, hardening rate controllers (i.e., retarders or accelerators) can be used to extend or shorten the time necessary for curing the epoxy resin composition. Examples of retarders suitable for use in the present invention include low molecular weight organic acid esters (e.g., alkyl esters of low molecular weight alkyl acids containing from about 2 to about 3 carbon atoms). Examples of accelerators suitable for use in the inventive composition include: 2,4,6-tris dimethylaminomethyl-phenol; the ethylhexanoate salt of 2,4,6-tris dimethylaminomethylphenol; and weak organic acids such as fumaric acid, erythorbic acid, ascorbic acid, and maleic acid. Any hardening rate controller used in the present invention will preferably be present in an amount in the range of from about 0 to about 10 parts by weight per 100 parts by weight of epoxy resin used in the composition.

The inventive well treating composition can further include one or more surfactants which enable the epoxy resin system to rapidly coat the particulate material. Examples of such surfactants suitable for use in the present invention and desirable concentrations thereof are disclosed in U.S. Pat. No. 5,128,390.

In order to further facilitate the coating of the particulate material, the inventive composition can also include an aliphatic alcohol which is only slightly water-soluble. Examples of preferred aliphatic alcohols include isoamyl alcohol and isohexyl alcohol. When used, such alcohols are preferably present in the inventive composition in an amount in the range of from about 1 to about 2.5 gallons per 1000 gallons of gelled aqueous carrier liquid.

As will be understood by those skilled in the art and as explained in U.S. Pat. No. 5,128,390, the inventive composition can also include other surfactants which operate as oil-water demulsifiers, foaming agents, and the like.

The inventive well treating composition can be conveniently formed at the well site. In forming the inventive composition, the gelled aqueous carrier liquid is preferably first prepared by combining the gelling agent with water. The resulting gelled aqueous carrier is then preferably conducted to a continuous stream mixing tub or other commonly used continuous mixing apparatus. In the mixing tub, the remaining components of the inventive composition are continuously added to and mixed with the gelled aqueous carrier liquid. As the components are mixed, the resulting mixture is continuously drawn from the mixing tub and injected into the well such that the inventive composition is placed or injected into a desired subterranean zone.

As the inventive composition flows down the well tubing toward the subterranean zone, the inventive composition is thoroughly blended such that: (a) the particulate material is suspended in the gelled aqueous carrier liquid; (b) the components of the epoxy resin system are thoroughly blended; (c) the finely-divided hardening agent is thoroughly blended with the epoxy resin system; and (d) the particulate material is thoroughly coated with the epoxy resin system/finely-divided hardening agent blend.

In one embodiment of the inventive method, the inventive well treating composition is injected into a well under sufficient pressure to form fractures in a subterranean formation. The resin-coated particulate material deposits and consolidates in these fractures to provide fluid-permeable flow paths within the formation.

In another embodiment of the inventive method, the inventive well treating composition is used in an otherwise conventional gravel packing operation. In the inventive gravel packing operation, the inventive well treating composition is delivered, for example, to an open subterranean zone (e.g., an underreamed well bore) surrounding a screening device (e.g., a perforated liner wrapped with a wire screen) whereby the resin-coated particulate material deposits and consolidates around the screening device to form a hard, fluid-permeable mass.

If desired, the epoxy resin system and finely-divided hardening agent components of the inventive composition can be premixed to form an inventive one-package epoxy system. Thus, a large batch of the inventive one-package epoxy system can be prepared and stored at a desired location. Portions of the one-package system can then be delivered, when needed, to one or more well sites.

In order to prevent the inventive one-package system from hardening, the system is maintained under temperature conditions such that the finely-divided hardening agent does not substantially dissolve in the epoxy resin system. Consequently, the finely-divided hardening agent used in the present invention will preferably be a hardening agent which will not substantially dissolve in the epoxy resin system at temperatures of up to at least about 25° C.

In one embodiment of the present invention, the inventive one-package epoxy system is prepared a substantial period (e.g., at least one day) in advance of the time that the inventive well treating composition containing the one-package system is to be injected into a well. When the hardening agent used in the inventive one-package system is 4,4'-DDS, the one-package system can generally be stored at temperatures not exceeding about 75° F. for a period of more than 25 days. Substantial dissolution of the 4,4'-DDS hardening agent typically will not occur until the temperature of the epoxy resin system is raised to about 90° F.

Throughout the inventive well treatment method, the finely-divided hardening agent is preferably maintained under temperature conditions such that the hardening agent does not substantially dissolve in the epoxy resin system until after the inventive well treating composition is injected into the well. When the inventive composition is exposed to the elevated temperatures existing in the subterranean zone, the finely-divided hardening agent dissolves in the epoxy resin system and then operates to harden the epoxy resin whereby the resin-coated particulate material forms a hard, consolidated, permeable mass.

The following examples are presented in order to further illustrate the present invention.

EXAMPLE I

The viscosity development characteristics of an epoxy resin system at 100° F. and 120° F. were evaluated over several days. The epoxy resin system consisted of 66 grams of "MYO500" (a diglycidyl ether of para-aminophenol available from CIBA GEIGY Corporation) mixed with 7.92 grams of 1,4-butanediol diglycidyl ether. The results of these tests are provided in Table 1. The results indicate that the epoxy resin system will undergo self-polymerization at elevated temperatures without the addition of a hardening agent. Such self-polymerization is likely to occur as a result of the presence of tertiary nitrogens in the backbone of the epoxy resin molecule.

In view of these results, it is apparent that the epoxy resin used in the inventive composition will preferably be a resin which will not substantially self polymerize at ambient conditions prior to the time at which the inventive composition is properly placed in the desired subterranean zone.

TABLE 1
VISCOSITY* (cps) OF EXAMPLE I EPOXY RESIN SYSTEM

| Days | Viscosity at (°F.) | |
|---|---|---|
| | 100° F. | 120° F. |
| 0 | 80000 | 72000 |
| 1 | 76000 | 72000 |
| 2 | 76000 | 72000 |
| 3 | 80000 | 76000 |
| 5 | 92000 | 80000 |
| 6 | 80000 | 80000 |
| 7 | 80000 | 80000 |
| 8 | 76000 | 80000 |
| 9 | 76000 | 80000 |
| 10 | 80000 | 80000 |
| 11 | 92000 | 88000 |
| 12 | 88000 | |
| 15 | 80000 | |
| 20 | 80000 | |
| 25 | 88000 | |
| 30 | 92000 | |
| 36 | 108000 | |

*Measured with RVT Brookfield viscometer at 1 rpm with spindle #4.

EXAMPLE II 55.44 g of 4,4'-DDS powder in 4 ml of butyl lactate were mixed with 98.6 g of an epoxy resin system identical to the epoxy resin system tested in Example I. The resulting dispersion was divided in four portions. Portions 1, 2, 3, and 4 were maintained, respectively, at room temperature (i.e., about 75° F.), at 90° F., at 100° F., and at 120° F. The viscosity of each composition was monitored over a number of days.

As indicated in Table 2, the dispersion maintained at room temperature did not substantially harden during the entire 26 day testing period. The compositions maintained at 90° F. and 100° F., on the other hand, underwent significant hardening after four days and two days, respectively.

Thus, the one-package epoxy system tested in this Example would appear to have a relatively long pot life when stored at temperatures not substantially exceeding 75° F.

TABLE 2
VISCOSITY OF THE ONE-PACKAGE EPOXY SYSTEM PREPARED IN EXAMPLE II

| Days | Viscosity* at (°F.) | | | |
|---|---|---|---|---|
| | RT** | 90° F. | 100° F. | 120° F. |
| 0 | 36000 | 48000 | 16000 | 32000 |
| 1 | 36000 | 36000 | 24000 | 40000 |
| 2 | 36000 | 28000 | 16000 | 64000 |
| 3 | 36000 | 36000 | 24000 | 160000 |
| 4 | 44000 | 32000 | 24000 | 640000 |
| 5 | 44000 | 44000 | 28000 | 1600000 |
| 6 | 48000 | 44000 | 32000 | |
| 7 | 48000 | 72000 | 36000 | |
| 8 | 48000 | 88000 | 80000 | |
| 9 | 20000 | 112000 | 80000 | |
| 10 | 20000 | 240000 | 160000 | |
| 11 | 20000 | 256000 | 232000 | |
| 12 | 20000 | 400000 | 432000 | |
| 13 | 20000 | 688000 | 944000 | |
| 14 | 20000 | 1472000 | 1600000 | |
| 15 | 16000 | 1600000 | | |
| 26 | 16000 | | | |

*Measured with RVT Brookfield viscometer at 1 rpm with spindle #4.
**Room temperature (i.e., about 75° F.).

EXAMPLE III

Numerous one-package epoxy systems were prepared by mixing powdered 4,4'-DDS with various epoxy resin systems. The compositions of these one-package systems are set forth in Table 3. In some cases, the powdered 4,4'-DDS composition used in the blending process was a powdered 4,4'-DDS/methanol slurry.

Each of the one-package epoxy systems was used to coat a sand material suspended in a carrier. In each instance, the resin mixture in question was added to an amount of the sand/carrier suspension and the resulting composition was blended for 3 minutes using an overhead stirrer. The sand/carrier used in each case contained 8 pounds of sand per 100 gallons of carrier liquid.

Following the coating procedure, each of the resin-coated particulate materials was cured. Table 4 provides the curing conditions used in each case as well as the type of sand used, the amount of one-package system used per sack of sand, and the carrier liquid used in each case.

Following the curing process, the compressive strengths, glass transition temperatures, and melt temperatures of the resulting consolidated materials were determined. These properties are provided in Table 4.

As indicated in Table 4, the one-package epoxy/DDS dispersions provided by the present invention were effective for coating suspended sand and for providing consolidated materials having compressive strengths substantially exceeding the compressive strength of uncoated sand.

The glass transition temperature (Tg) of a cured epoxy resin generally indicates the upper useful temperature limit of the cured resin. As indicated in Table 4, almost all of the hardened compositions prepared in this Example had glass transition temperatures exceeding 200° F. Several of the hardened compositions exhibited glass transition temperatures approaching or exceeding 350° F.

TABLE 3

EPOXY SYSTEM COMPOSITIONS USED FOR SAND COATING

| Components[1] | \multicolumn{14}{c}{Compositions} |
|---|---|

| Components[1] | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| "MYO500"[2] | 0.83 | 0.83 | 0.83 | 0.83 | 0.83 | 0.83 | 0.83 | 0.83 | 0.83 | 0.83 | 0.83 | 0.83 | 0.83 | 0.83 |
| "MY720"[3] | | | | | | | | | | | | | | |
| "RD-2"[4] | 0.17 | 0.17 | 0.17 | 0.17 | 0.17 | 0.17 | 0.17 | 0.17 | 0.17 | 0.17 | 0.17 | 0.17 | 0.17 | 0.17 |
| "ER-1"[5] | | | | | | | | | | | | | | |
| "HT 976"[6] | 1.0 | 1.0 | 1.0 | 1.0 | 1.0 | 1.0 | 1.0 | 1.0 | 1.0 | 1.0 | 1.0 | 1.0 | 1.0 | 1.0 |
| Methanol (mL/g of "HT 976") | | | | | | | 0.1 | 0.25 | | | | 0.1 | 0.1 | 0.1 |

| Components[1] | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| "MYO500"[2] | 0.83 | 0.83 | 0.83 | 0.83 | 0.83 | 0.83 | 0.83 | 0.83 | 0.83 | 0.83 | 0.83 | 0.33 | | |
| "MY720"[3] | | | | | | | | | | | | | 0.80 | 0.80 |
| "RD-2"[4] | 0.17 | 0.17 | 0.17 | 0.17 | 0.17 | 0.17 | 0.17 | 0.17 | 0.17 | 0.17 | 0.17 | | 0.20 | 0.20 |
| "ER-1"[5] | | | | | | | | | | | | 66 | | |
| "HT 976"[6] | 1.0 | 1.0 | 1.0 | 1.0 | 1.0 | 1.0 | 1.0 | 1.0 | 1.0 | 1.0 | 1.0 | 1.0 | 1.0 | 1.0 |
| Methanol (mL/g of "HT 976") | 0.1 | 0.1 | 0.1 | 0.1 | 0.1 | 0.1 | | | | | 0.1 | | | |

[1]Unless otherwise indicated, all component concentrations are expressed in terms of gram equivalents. For an epoxy resin, the weight amount of the epoxy resin corresponding to one equivalent equals the molecular weight of the epoxy resin divided by the number of epoxide groups contained in the epoxy resin molecule. The gram equivalent weight of 4,4'-diaminodiphenyl sulfone is 7.56 g per equivalent.
[2]Diglycidyl ether of para-aminophenol available from CIBA-GEIGY Corporation.
[3]N,N,N',N'-tetraglycidyl-4,4'-methylenebisbenzenamine available from CIBA-GEIGY Corporation.
[4]1,4-butanediol diglycidyl ether available from CIBA-GEIGY Corporation.
[5]"EPI-REZ ® 5071" available from Rhone-Poulenc. "EPI-REZ ® 5071" consists of a blend of 89% by weight of a diglycidyl ether of bisphenol A and 11% butyl glycidyl ether.
[6]Powdered 4,4'-diaminodiphenyl sulfone available from CIBA-GEIGY Corporation.

TABLE 4

SAND COATING RESULTS

| Composition | Cure Time (Hours) | Cure Temp (°F.) | Sand Type | Gallons of Composition Used Per Sack of Sand | Carrier Liquid | Comp. Str. (PSI) at (°F.) RT[4] | 250° F. | 275° F. | Tg[5] (°F.) | Tm[6] (°F.) |
|---|---|---|---|---|---|---|---|---|---|---|
| 1 | 20 | 250 | Resieved[7] | 1/2 | Water | 5021 | 3954 | | 257 | 302 |
| 2 | 20 | 250 | Resieved | 1/2 | A[1] | 2318 | 1622 | | 266 | 345 |
| 3 | 20 | 250 | Resieved | 1/2 | A | 845 | 655 | | 212 | 279 |
| 4 | 72 | 300 | Resieved | 1/2 | A | 3521 | 2357 | | 325 | 396 |
| 5 | 72 | 300 | Resieved | 1/2 | Water | 4684 | 4095 | | 325 | 396 |
| 6 | 20 | 275 | Resieved | 3/8 | A | 728 | | 507 | 320 | 356 |
| 7 | 20 | 275 | Resieved | 3/8 | A | 2618 | | 1528 | 311 | 347 |
| 8 | 20 | 275 | Resieved | 3/8 | A | 516 | | 379 | 320 | 356 |
| 9 | 65 | 275 | Resieved | 3/8 | A | 2137 | | 1998 | 347 | 376 |
| 10 | 65 | 275 | Frac | 3/8 | A | 377 | | 715 | 347 | 376 |
| 11 | 65 | 275 | Resieved | 3/8 | A | 2878 | | 1803 | 356 | 380 |
| 12 | 20 | 275 | Resieved | 3/8 | A | 1732 | | 1260 | 338 | 365 |
| 13 | 20 | 275 | Resieved | 3/8 | A | 2488 | | 1092 | 320 | 349 |
| 14 | 20 | 275 | Frac | 3/8 | A | 852 | | 497 | 302 | 342 |
| 15 | 44 | 275 | Frac | 3/8 | A | 2137 | | 456 | 302 | 342 |
| 16 | 44 | 275 | Resieved | 3/8 | A | 1766 | | 600 | 347 | 367 |
| 17 | 20 | 275 | Resieved | 3/8 | A | 1010 | | 650 | 311 | 342 |
| 18 | 20 | 275 | Frac | 1/2 | B[2] | 1392 | | 743 | 302 | 338 |
| 19 | 20 | 275 | Frac | 1/2 | C[3] | 1305 | | 1373 | 284 | 347 |
| 20 | 20 | 275 | Frac | 1/2 | B | 2185 | | 1486 | 284 | 347 |
| 21 | 20 | 275 | Frac | 1/2 | B | 1902 | | 1121 | 302 | 351 |
| 22 | 44 | 275 | Frac | 1/2 | B | 2157 | | 887 | 329 | 3654 |
| 23 | 20 | 275 | Frac | 1/2 | B | 3885 | | 1978 | 194 | 275 |
| 24 | 44 | 275 | Frac | 1/2 | B | 3878 | | 1291 | 203 | 293 |
| 25 | 20 | 275 | Frac | 3/5 | B | 3188 | | 1619 | 365 | 387 |
| 26 | 44 | 275 | Resieved | 3/8 | A | 1924 | | 798 | 302 | 342 |
| 27 | 66 | 250 | Resieved | 1/2 | Water | 5043 | 3478 | | 302 | 334 |
| 28 | 66 | 300 | Resieved | 1/2 | | | | 365 | | 405 |

[1]Carrier liquid A was an aqueous gel composed of 40 lb. of hydroxypropyl guar per 1000 gallons of an aqueous 2% KCl solution and having a pH of 7.
[2]Carrier liquid B was an aqueous gel composed of 40 lb. of hydroxypropyl guar per 1000 gallons of an aqueous 2% KCl solution and having a pH of 5.
[3]Carrier liquid C was an aqueous gel composed of 40 lb. of hydroxypropyl guar per 1000 gallons of an aqueous 2% KCl solution and having a pH of 9.5.
[4]Room temperature (75° F.).
[5]Glass transition temperature taken as beginning of endotherm.
[6]Melt temperature taken as maximum of endotherm.
[7]Resieved sand size was 20/40 U.S. mesh.
[8]Frac sand used in tests was 20/40 mesh Ottawa frac sand.

EXAMPLE IV

A one-package epoxy system consisting of 66 grams of "MYO500", 7.92 grams of "RD-2", 3 mL of butyl lactate, 1.5 mL of N-beta-(aminoethyl)-gamma-aminopropyltrimethoxy-silane, 41.58 grams of "HT976", and 11.55 mL of methanol was prepared by mixing using an overhead stirrer. A first portion of this composition was used to coat 20/40 mesh Ottawa frac sand at a concentration of 0.5 gallons of the one-package epoxy system per 100 lb. sack of sand. A second portion of the one-package system was used to coat 20/40 mesh Ottawa frac sand at a concentration of 0.375 gallons of the one-package system per 100 lb. sack of sand. The procedure used in each case for coating the sand with the one-package system involved the steps of: suspending the sand in a gelled aqueous carrier liquid at a concentration of 8 pounds of sand per 100 gallons of gelled liquid; adding the one-package epoxy system to the sand/carrier liquid suspension; and blending the resulting composition for 3 minutes using an overhead mixer. The gelled carrier liquid had a pH of 9.5 and was composed of 40 lb. of hydroxypropyl guar per 1000 gallons of aqueous liquid. The aqueous liquid used was an aqueous 2% KCl solution.

Each of the resin-coated sand compositions was cured for 24 hours at 275° F. and 1000 psi closure pressure in an API linear conductivity cell.

Following the curing procedure, water flow was initiated through each of the conductivity cells and the conductivities of the materials therein were determined. Flow conductivities for each of the materials were then determined at closure pressures of 4000 psi and 6000 psi. The conductivity values obtained in these tests are recorded in Table 5.

For comparison purposes, the fluid conductivity of uncoated 20/40 Ottawa sand was also determined at closure pressures of 1000 psi, 4000 psi, and 6000 psi. The results of these tests are also shown in Table 5.

As indicated in Table 5, the fluid conductivities of the consolidated materials prepared using the inventive one-package epoxy system substantially exceeded the fluid conductivities of the uncoated sand.

At the end of the flow conductivity test, each of the consolidated compositions remained consolidated. Scanning electron microscope analysis indicated that the hardened epoxy surface coatings formed in each case were not in any way substantially disrupted by the high pressure flow tests.

TABLE 5

| | FRACTURE CONDUCTIVITY DATA | | |
|---|---|---|---|
| | Conductivity (md-ft) | | |
| Stress (psi) | .375 gal/sack | .5 gal/sack | No Resin |
| 1000 | 5385 | 5614 | 4231 |
| 4000 | 4225 | 3040 | 2422 |
| 6000 | 3029 | 2416 | 950 |

EXAMPLE V

A dispersion consisting of 41.58 grams of "HT 976" powder, 66 grams of "MYO500", 7.92 grams of "RD-2", and 3 milliliters of butyl lactate was prepared by mixing with an overhead stirrer. 1.5 milliliters of N-beta-(aminoethyl)-gamma-aminopropyltrimethoxy silane coupling agent and 11.55 milliliters of methanol were added to the dispersion and mixed therewith using said overhead stirrer.

A portion of the resulting mixture was used to coat 20/40 mesh Ottawa frac sand in an amount of 0.5 gallons of mixture per 100 lb. sack of sand. A second portion of the mixture was used to coat 20/40 mesh Ottawa frac sand in an amount of 0.75 gallons of mixture per 100 lb. sack of sand. During the sand coating process, the sand was suspended in an aqueous gel having a pH of 9.5 and consisting of 40 pounds of hydroxypropyl guar per 1000 gallons of aqueous 2% KCl solution. In each case, the sand/gelled carrier suspension consisted of 8 pounds of sand per 100 gallons of the gelled aqueous carrier liquid. The sand coating procedure used was essentially identical to the coating procedure described in Example III.

Each of the resin-coated sand compositions was cured in an API linear conductivity cell for 20 hours at a temperature of 275° F. After hardening, each of the consolidated materials had a compressive strength of 1300 psi at 275° F. At a closure pressure of 600 psi, the 0.5 gallon per sack material exhibited a flow conductivity of 2500 md-ft whereas the 0.75 gallon per sack material exhibited a flow conductivity of 3000 md-ft. Since, as indicated above, the fracture conductivity of uncoated 20/40 mesh Ottawa frac sand under these conditions is only 950 md-ft, the hardened inventive compositions exhibited fracture conductivities substantially exceeding the fracture conductivity of uncoated sand.

EXAMPLE VI

Twelve epoxy novolac based one-package epoxy systems (i.e., resin system compositions 29–40) having the compositions set forth in Table 6 were prepared. Resin system compositions 29–33 were prepared by mixing together 19 g of "SU 2.5", 3.3 g of "HELOXY 5044", 1 mL of "ED-1", and 7.56 g of "HT 976" for 150 minutes using a mechanical stirrer. To this mixture was added 0.5 mL of A1120 followed by 15 minutes of additional stirring. Next 3 mL of methanol were added followed by 5 additional minutes of stirring. The resulting mixture was then used, in the amounts set forth in Table 6, to coat 20/40 mesh Ottawa sand in an aqueous gel carrier.

Resin system compositions 34–36 were prepared by mixing together 19 g of SU 2.5, 3.3 g of "HELOXY 5044", 1 mL of "ED-1", and 0.5 mL of "A1120" for 15 minutes. Next 7.56 g of "HT 976" dispersed in 7 mL of methanol were added followed by one minute of additional stirring. The resulting mixture was then used in the amounts set forth in Table 6 to coat 20/40 mesh Ottawa sand in an aqueous carrier gel.

Resin system compositions 37–40 were prepared by mixing together, in the amounts set forth in Table 6, SU 2.5, "HELOXY 5044", and "A1120" for 15 minutes using a mechanical stirrer. A second composition containing "HT 976", "ED-1", and methanol in the amounts set forth in Table 6 was prepared by mixing these components together for 10 minutes using a mechanical stirrer. The second composition was added to the first composition and the resulting mixture was stirred for one minute. The final stirred mixture was then used in the amounts set forth in Table 6 to coat 20/40 mesh Ottawa sand in an aqueous carrier gel.

The gelled aqueous carrier liquid used in each case contained 40 lb. of hydroxypropyl guar per 1000 gallons of aqueous liquid (i.e., 2% aqueous KCl solution) and had a pH of 5. In each case, the sand/carrier liquid suspension used consisted of 500 g of sand per 555 mL of gelled aqueous carrier liquid.

In each case, the sand was coated with the resin composition by mixing the resin composition with the sand/carrier suspension using an overhead stirrer. Following the coating procedure, each of the resin coated sand materials was packed in a separate glass tube and cured in an oven. The curing conditions used, as well as the compressive strengths and glass transition temperatures exhibited by the cured materials, are recorded in Table 6.

As indicated by the compressive strength and glass transition temperature characteristics exhibited by compositions 29–40, these epoxy novolac based resin systems provided consolidated materials which were well-suited for use at temperatures exceeding 300° F.

TABLE 6

| | COMPOSITIONS TESTED IN EXAMPLE VI | | | | | | | | | | | |
|---|---|---|---|---|---|---|---|---|---|---|---|---|
| | 29 | 30 | 31 | 32 | 33 | 34 | 35 | 36 | 37 | 38 | 39 | 40 |
| RESIN SYSTEM COMPONENTS[6] | | | | | | | | | | | | |
| SU 2.5[1] | 0.83 | 0.83 | 0.83 | 0.83 | 0.83 | 0.83 | 0.83 | 0.83 | 0.83 | 0.83 | 0.83 | 0.83 |
| "HELOXY 5044"[2] | 0.17 | 0.17 | 0.17 | 0.17 | 0.17 | 0.17 | 0.17 | 0.17 | 0.17 | 0.17 | 0.17 | 0.17 |
| "HT 976"[3] | 1.0 | 1.0 | 1.0 | 1.0 | 1.0 | 1.0 | 1.0 | 1.0 | 1.0 | 1.0 | 1.0 | 1.0 |
| "ED-1"[4] (mL/g of "HT 976") | 0.13 | 0.13 | 0.13 | 0.13 | 0.13 | 0.13 | 0.13 | 0.13 | 0.32 | 0.32 | 0.32 | 0.32 |
| Methanol (mL/g of "HT 976") | 0.40 | 0.40 | 0.40 | 0.40 | 0.40 | 0.93 | 0.93 | 0.93 | 0.32 | 0.32 | 0.32 | 0.48 |
| A1120[5] (mL/g of "HT 976") | 0.022 | 0.022 | 0.022 | 0.022 | 0.022 | 0.022 | 0.022 | 0.022 | 0.022 | 0.022 | 0.022 | 0.022 |
| CONSOLIDATED BLEND | | | | | | | | | | | | |
| Gallons of Resin System Used per Sack of Sand | 3/8 | 3/8 | 3/8 | 3/8 | 3/8 | 1/2 | 3/8 | 1/2 | 3/8 | 1/2 | 3/8 | ⅜ |
| Curing Temp. (°F.) | 275 | 275 | 275 | 275 | 275 | 275 | 275 | 275 | 275 | 275 | 275 | 275 |
| Curing Time (Hours) | 20 | 70 | 20 | 44 | 20 | 20 | 20 | 20 | 20 | 20 | 20 | 20 |
| Compressive Strength at 72° F. (psi) | 3042 | — | 3494 | 3252 | 2165 | 2553 | 3538 | 1378 | 2556 | 3260 | 2052 | 1353 |
| Compressive Strength at 275° F. (psi) | 1148 | — | 1370 | 1058 | 365 | 1339 | 1050 | 935 | 1064 | 1169 | 1357 | 270 |
| Tg (°F.) | 248 | 338 | 311 | 333 | 302 | 311 | 311 | 275 | 302 | 320 | 288 | 279 |
| Tm (°F.) | 311 | 351 | 334 | 352 | 347 | 336 | 336 | 347 | 342 | 347 | 329 | 339 |

[1]Multifunctional epoxy novolac resin available from Rhone-Poulenc.
[2]Trimethylolethane triglycidyl ether available from Pacific Anchor.
[3]4,4'-diaminodiphenylsulfone available from CIBA-GEIGY.
[4]Butyl lactate.
[5]N-beta-(aminoethyl)-gamma-aminopropyl-trimethoxysilane available from Union Carbide.
[6]Unless otherwise indicated, all component concentrations are expressed in terms of gram equivalents. For an epoxy resin, the weight amount of the epoxy resin corresponding to one equivalent equals the molecular weight of the epoxy resin divided by the number of epoxide groups contained in the epoxy resin molecule. The gram equivalent weight of 4,4'-diaminodiphenyl sulfone is 7.56 g per equivalent.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of treating a subterranean zone in a well comprising the steps of:
   (a) preparing a treating composition comprising:
      a gelled carrier,
      a particulate material,
      an epoxy resin system including at least one epoxy resin, and
      a finely-divided hardening agent which, when dissolved, is operable for hardening said epoxy resin, at least a portion of said finely-divided hardening agent being dispersed in said epoxy resin system;
   (b) injecting said treating composition into said well such that said treating composition is placed in said subterranean zone; and
   (c) maintaining said finely-divided hardening agent under conditions such that, prior to injecting said treating composition into said well in accordance with step (b), said finely-divided hardening agent does not substantially dissolve.

2. The method of claim 1 further comprising the step, prior to step (a), of
   (d) premixing said finely-divided hardening agent with said epoxy resin system.

3. The method of claim 2 wherein said finely-divided hardening agent is premixed with said epoxy resin system in accordance with step (d) at least one day prior to step (b).

4. The method of claim 2 wherein said epoxy resin system further includes at least one solvent.

5. The method of claim 2 wherein said finely-divided hardening agent is premixed with said epoxy resin system in accordance with step (d) by mixing with said epoxy resin system a slurry comprising said finely-divided hardening agent and a carrier liquid.

6. The method of claim 5 wherein said carrier liquid is a member selected from the group consisting of methanol, ethanol, isopropyl alcohol, ethyl acetate, butyl lactate, toluene, xylene, isoamyl alcohol, isohexyl alcohol, and mixtures thereof.

7. The method of claim 1 wherein said treating composition is prepared in step (a) by:
   (i) adding said particulate material to a substantially continuous stream comprising water and a gelling agent and
   (ii) adding said epoxy resin system and said finely-divided hardening agent to said continuous stream.

8. The method of claim 1 wherein said finely-divided hardening agent is 4,4'-diaminodiphenylsulfone.

9. The method of claim 1 wherein said subterranean zone is a subterranean formation and said treating composition is injected into said well in accordance with step (b) under sufficient pressure to fracture said subterranean formation.

10. The method of claim 1 wherein said treating composition is injected into said well in accordance with step (b) such that said particulate material is coated with said epoxy resin system and said finely-divided hardening agent and said coated particulate material is deposited in said subterranean zone around a screening device.

* * * * *